United States Patent [19]

Stewart et al.

[11] Patent Number: 5,087,692
[45] Date of Patent: Feb. 11, 1992

[54] PREPARATION OF LINEAR POLYCARBONATES FROM CYCLIC OLIGOMER COMPOSITIONS WITH SALICYLIC ACID SALT AS CATALYST

[75] Inventors: Kevin R. Stewart; Andrew J. Salem, both of Schenectady, N.Y.

[73] Assignee: General Electric Company, Schenectady, N.Y.

[21] Appl. No.: 534,566

[22] Filed: Jun. 7, 1990

Related U.S. Application Data

[63] Continuation-in-part of Ser. No. 431,818, Nov. 6, 1989, abandoned.

[51] Int. Cl.$^5$ ............................................. C08G 64/38
[52] U.S. Cl. .................................... 528/371; 524/611; 524/612; 528/196; 528/198; 528/200; 528/370
[58] Field of Search ............... 528/371, 370, 196, 198, 528/200; 524/611, 612

[56] References Cited

U.S. PATENT DOCUMENTS 4,778,875 10/1988 Stewart ................................ 528/371

*Primary Examiner*—Harold D. Anderson
*Attorney, Agent, or Firm*—William H. Pittman; James C. Davis, Jr.

[57] ABSTRACT

Cyclic polycarbonate oligomers are converted to linear polycarbonates by the catalytic action of a monobasic metal salicylate. The polymerization reaction takes place only at relatively high temperatures, typically above about 220° C., and rapidly only at temperatures above about 250° C., and is therefore particularly useful in such operations as resin transfer molding. The catalyst may be coated on a fibrous reinforcing material used for composite formation.

20 Claims, 5 Drawing Sheets fig. 1 fig. 2 fig. 3 fig. 5 fig. 6

PREPARATION OF LINEAR POLYCARBONATES FROM CYCLIC OLIGOMER COMPOSITIONS WITH SALICYLIC ACID SALT AS CATALYST

This application is a continuation-in-part of copending application Ser. No. 07/431,818, filed Nov. 6, 1989, now abandoned.

This invention relates to the preparation of linear polycarbonates and similar condensation polymers, and more particularly to a method for their preparation from cyclic oligomer compositions.

The conversion of low molecular weight cyclic aromatic carbonate polymers to linear polycarbonates is known. Reference is made, for example, to the following U.S. Pat. Nos.

| | |
|---|---|
| 3,155,683 | 3,386,954 |
| 3,274,214 | 3,422,119. |

More recently, cyclic polycarbonate oligomer mixtures have been prepared and converted to linear polycarbonates, often of very high molecular weight, by contact with a wide variety of polycarbonate formation catalysts. Reference is made, for example, to U.S. Pat. Nos. 4,644,053 and 4,740,583, the disclosures of which are incorporated by reference herein.

Many of the catalysts used to convert cyclic polycarbonates to linear polymers have relatively rapid action above a relatively low threshold temperature, typically about 200° C. This is, of course, often desirable, since there is frequently nothing gained by prolonging the polymerization reaction. However, under certain circumstances (for example, when the catalyst is premixed with the cyclics) it may be desirable for the reaction mixture to be essentially inert or slow to polymerize at lower temperatures, typically below about 250° C., and to undergo rapid polymerization at higher temperatures.

An example of such a circumstance is manufacture of resinous composites by the resin transfer molding process. It typically involves transfer of the material to be polymerized from a heated vessel into a mold which contains a reinforcing material, typically a fiber mat. In order to facilitate transfer and thorough wetting of the mat, the material must be maintained liquid and at a relatively low viscosity, which may require temperatures as high as about 220° C.

It is virtually essential to avoid polymerization under the conditions prevailing when the cyclics composition has been liquefied, so that transfer and fiber wetting are optimized. On the other hand, rapid polymerization once the composition has wetted the fibers in the mold is highly desirable. One method of achieving those objects is disclosed in U.S. Pat. No. 4,714,737; it comprises coating the catalyst on the fibers, whereby polymerization cannot occur to any appreciable extent until contact between the fibers and cyclics composition takes place.

Many fibrous reinforcing materials are highly polar; an example is fibrous glass, which contains multiple Si-OH bonds on its surface. Particularly when a polar reinforcing material is employed, it is desirable to employ a polar solvent such as water to deposit a highly polar catalyst thereon, both because such a catalyst inherently forms a uniform coating on the fibers and because the water enhances the uniformity of said coating.

The catalysts and solvents disclosed in the aforementioned U.S. Pat. No. 4,714,737 are for the most part water-insoluble and relatively non-polar. When such a catalyst and solvent are employed, catalyst may be lost from the fibers during handling and leached therefrom by the resin flowing into contact therewith.

The present invention provides a method for polymerizing cyclic polycarbonates which employs catalysts essentially lacking in activity at relatively low temperatures, typically up to about 220° C., facilitating resin transfer molding and similar operations. Said catalysts are highly polar and water-soluble, and may be uniformly coated on glass fibers if desired. The invention also provides polymerizable compositions having the same advantages.

In one of its aspects, therefore, the invention includes a method for preparing a resinous composition which comprises contacting, at a temperature in the range of about 220°–350° C., at least one cyclic polycarbonate oligomer with a catalytic amount of at least one monobasic metal salicylate.

The cyclic polycarbonate oligomer compositions useful in the method of this invention generally comprise a plurality of structural units of the formula wherein at least about 60% of the total number of R values are divalent aromatic organic radicals, the balance thereof being aliphatic, alicyclic or aromatic organic radicals. Such compositions include dimers, trimers and tetramers, as well as cyclic polycarbonate oligomer mixtures.

The R values may be different but are usually the same, and may be aliphatic, alicyclic, aromatic or mixed; those which are aliphatic or alicyclic generally contain up to about 8 carbon atoms. Suitable R values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl.

Most often, however, all R radicals are hydrocarbon radicals.

Preferably at least about 80% of the total number of R values in the cyclic oligomer mixtures, and most desirable all of said R values, are aromatic. The aromatic R radicals preferably have the formula wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o-or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 5% of such linear oligomers, if any, are present.

The mixtures also usually contain low percentages, if any, of polymers (linear or cyclic) having a degree of polymerization greater than about 30. For the purposes of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, is easily achieved by precipitation with a non-solvent, as disclosed, for example, in the aforementioned U.S. Pat. No. 4,644,053.

According to the present invention, conversion of the cyclic polycarbonates to linear polycarbonates is effected by contact with at least one monobasic metal salicylate. The term "monobasic", as used herein, relates to the fact that salicylic acid can be considered a dibasic acid since it contains both an acidic carboxy group and an acidic phenol group. Only one of those acidic centers per molecule forms a salt according to the present invention.

Those skilled in the art recognize that the neutralization product of one mole of salicylic acid with one equivalent of a base exists in equilibrium, with a high predominance of the carboxylate salt as opposed to the phenate salt. It is this type of neutralization product which is employed according to the present invention.

The metal of the monobasic metal salicylate may be any metal which forms a predominantly ionic salt with salicylic acid. These include alkali metals such as lithium, sodium and potassium; alkaline earth metals such as magnesium, calcium, barium and strontium; and transition metals such as iron, cobalt, copper and zinc. The alkali metals and especially lithium are generally preferred.

The polymerization reaction is typically conducted by merely contacting the cyclic oligomer mixture with the catalyst at a temperature in the range of about 220°-350° C., preferably about 250°-300° C., until polymerization has proceeded to the extent desired. Although a solvent may be used, it is not necessary and is frequently not preferred.

Polymerizable compositions comprising cyclic oligomers which comprise units of formula I and at least one monobasic metal salicylate as described hereinabove are another aspect of the invention. They may be prepared by various methods, depending on the desired rapidity of initiation of cyclics polymerization.

For example, in situations where a mold can be rapidly filled and it is desired that polymerization begin promptly, the cyclics may be dissolved in a suitable solvent therefor such as methylene chloride and the salicylate may be intimately dispersed in the resulting solution. A particularly effective method of dispersion is dissolution of the salicylate in a relatively small amount of a liquid in which it is soluble, such as acetone, followed by addition of the resulting solution to the cyclics solution. The solvents are then evaporated to produce an intimate blend of the salicylate with the cyclics composition. Such blend is stable at ambient temperatures but may be slowly polymerized by heating to an appropriate temperature.

Another method, which may be useful when initiation of polymerization should be somewhat delayed, includes encapsulation of the catalyst in a polymer and incorporation of the encapsulated catalyst in the cyclic composition, as disclosed in U.S. Pat. Nos. 4,740,583 and 4,755,588.

Still another method is particularly useful when intiation of polymerization must be delayed for a relatively long period; for example, when a large mold or one containing a high proportion of fiber must be filled. In this method, the salicylate is coated on highly polar (usually glass) fibers which are then contacted with the cyclics composition, after which the resulting polymerizable composite is heated to polymerization temperatures. The coating method often involves contact of the fibers with an aqueous catalyst solution which may also contain conventional sizing agents. By reason of their high polarity, the salicylates employed according to the invention adhere strongly to the glass surface, probably at least in part by reason of bonding with Si-OH groups thereon.

The proportion of catalyst used in the method of this invention will depend to some extent on the molecular weight of the polymer desired and the time available for completion of the polymerization reaction Since a "living" polymerization is involved, the molecular weight of the polymer will vary inversely with the proportion of catalyst used. On the other hand, the reaction rate varies directly with the proportion of catalyst Therefore, as said proportion is increased, the time required for polymerization and the molecular weight of the product both decrease. Balancing these factors, it is generally found that catalyst proportions of about 0.001–2.0 mole percent, based on structural units in the oligomer, are satisfactory, with about 0.001–0.5 mole percent being preferred.

It is believed that the mode of action of the metal salicylates according to the present invention is the result of their decarboxylation to phenates. At temperatures up to about 220° C., they exist as the salicylates which are not nucleophilic enough to initiate the ring-opening polymerization of the cyclic polycarbonates. At higher temperatures, however, they lose carbon dioxide, slowly at temperatures in the range of about 220°–240° C. and more rapidly at higher temperatures. The phenates thus formed are known to function as catalysts for polymerization of cyclics by reason of the comparatively high nucleophilicity.

Therefore, it is generally found that at lower temperatures (for example, below about 250° C.), cyclic polycarbonates in contact with the monobasic metal salicylates are slowly, if at all, converted to linear polycarbonates. Above that temperature, polymerization begins at a relatively slow rate which increases as the temperature is raised. Thus, at temperatures within a few degrees of 250° C. polymerization is relatively slow and it is possible, for example, to transfer a liquid cyclic polycarbonate oligomer mixture from a heated vessel into a resin transfer molding tool at a relatively rapid rate before its viscosity increases to a level making transfer impossible. Polymerization proceeds in the tool, at even higher rates if the temperature is raised to a higher level.

Thus, the compositions of this invention may be liquefied and transferred to the molding tool under conditions of no or very slow polymerization, and subsequently the polymerization rate may be increased. This enables the cyclic polycarbonate oligomer mixtures to permeate and thoroughly wet densely packed beds of fibrous fillers in the molding tool, whereupon polymerization produces a thermoplastic composite having numerous uses which will be apparent to those skilled in the art.

Figure 1:
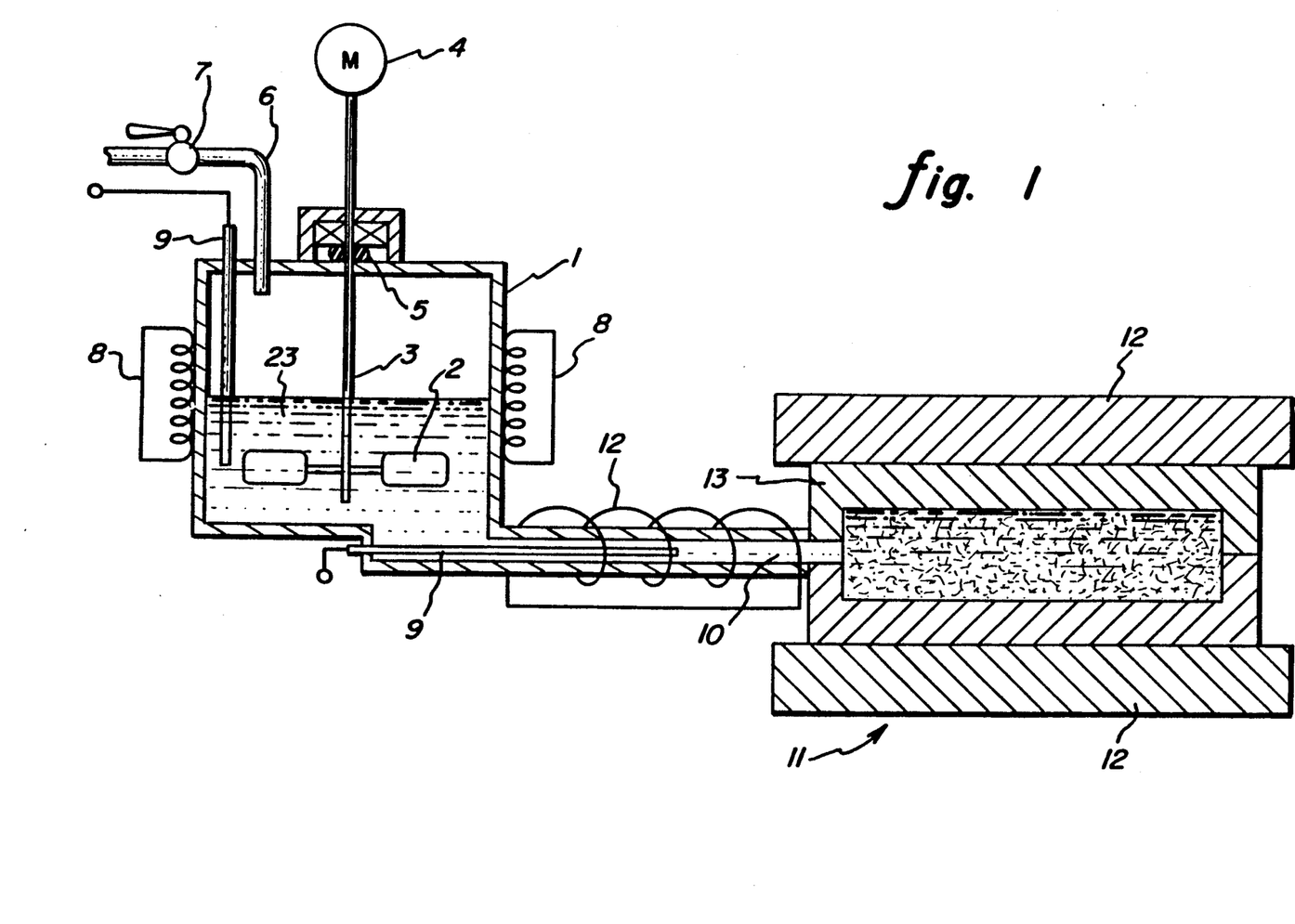
FIG. 1 is a cross-sectional view of a resin transfer molding apparatus suitable for use in the method of this invention.
Figure 2:
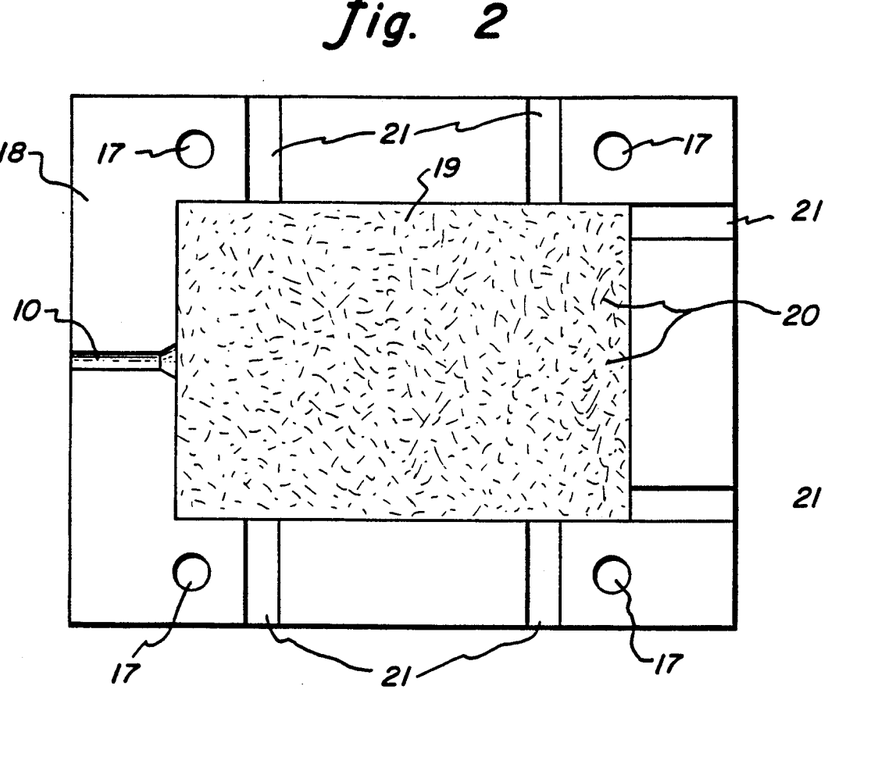
FIG. 2 is a top view.
Figure 3:
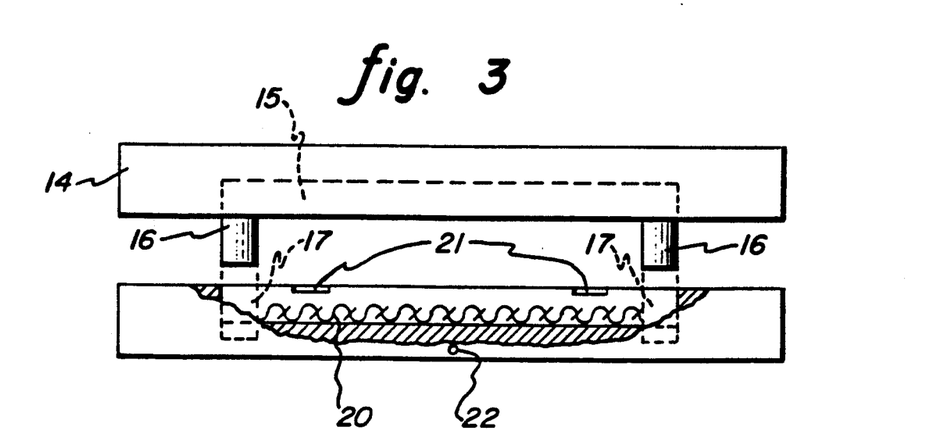
FIG. 3 a partially cut away end view of the bottom portion of a molding tool which forms part of said apparatus.

Reference is now made to FIGS. 1–3, which are various views of an illustrative resin transfer molding apparatus useful in the method of this invention. In FIG. 1, there is shown resin vessel 1 which may be made of suitable heat-resistant material such as steel, aluminum, glass or various other ceramics. Said vessel is fitted with stirrer 2 attached via shaft 3 to stirring motor 4; shaft 3 passes through the top wall of vessel 1 via gas-tight bearing assembly 5 of conventional design. Vessel 1 is also fitted with gas inlet tube 6 having valve 7; with conventionally designed heating means 8; with temperature sensing devices illustrated by thermocouples 9; and with conduit 10 communicating with molding tool 11. Conduit 10 is also heated via heating device 12. It is ordinarily convenient to employ conventional temperature controlling means whereby heating elements 8 and 12 respond to temperature readings provided by thermocouples 9, so as to maintain a temperature at which the composition of this invention remains liquid.

Molding subassembly 11 includes heated press 12 and a two-part landed molding tool 13, typically constructed of a highly heat-conductive metal such as steel or aluminum. The top portion 14 of said tool contains resin cavity 15 and includes securing pegs 16 which fit into holes 17 in the bottom part of the tool.

Said bottom part, designated 18, also includes resin cavity 19, which is typically initially filled with a suitable reinforcing medium 20, such as glass, polyamide or carbon fiber. It also contains vents 21 and a temperature sensing device illustrated by thermocouple 22.

In operation, vessel 1 is charged with cyclic polycarbonate oligomer composition 23, which is heated via heating elements 8 and stirred via stirrer 2. The metal salicylate may be added after the oligomers have been liquefied, or may be applied as a coating to the fibers of reinforcing medium 20.

When the temperature of the catalyzed oligomer composition, as sensed by thermocouples 9, is high enough for easy flow but not high enough for rapid polymerization to take place, an inert gas such as nitrogen or argon is introduced under pressure via gas inlet 6. This forces resin composition 23 through conduit 10 into molding tool 13 (which may be coated with a suitable mold release agent), from which air is expelled through vents 21. Press 12 is heated and exerts pressure on molding tool 13 so as to maintain it closed and at a temperature sufficient to maintain resin composition 23 in the liquid state and at relatively low viscosity, so that it thoroughly permeates glass fibers 20. A polymerizable composite substantially free from voids is thus obtained.

When molding tool 13 is filled, its temperature is raised so that polymerization takes place at the desired rate. After polymerization is complete, tool 13 is removed from press 12 and the two portions of the tool, 14 and 18, are separated for removal of the thermoplastic composite.

The invention is illustrated by the following examples. The cyclic polycarbonate composition used in each example was a mixture of bisphenol A cyclic polycarbonate oligomers, principally having degrees of polymerization from 2 to about 6 and substantially free from linear polycarbonate; molar proportions thereof are in terms of carbonate units. Molecular weights were determined by gel permeation chromatography relative to polystyrene.

EXAMPLES 1–2

Two polymerization experiments were run in an argon atmosphere at 240° and 280° C., in a reaction vessel fitted with a stirrer maintained at a constant speed of 100 rpm. by means of a motor which compensated for increasing viscosity by increasing the current. By means of a computer, plots were made of relative viscosity (as determined from current input) against time and the slopes of the resulting curves at the points of maximum rate of change of viscosity were determined. These slopes were in turn converted to relative polymerization rates, using lithium phenoxide as a standard having a value of 1.00. Since the viscosities at the points of maximum rate of change corresponded to a polymer level of only about 35–40% high molecular weight material, only the early part of each reaction was considered in this portion of the experiment.

In each example, a 50-gram portion of cyclic polycarbonate oligomers was heated and stirred for a period of time sufficient to establish that substantially no polymerization was taking place. Lithium salicylate in the amount of 0.1 mole percent was then added and stirring was continued as the viscosity data were taken and until the reaction was complete.

Figure 4:
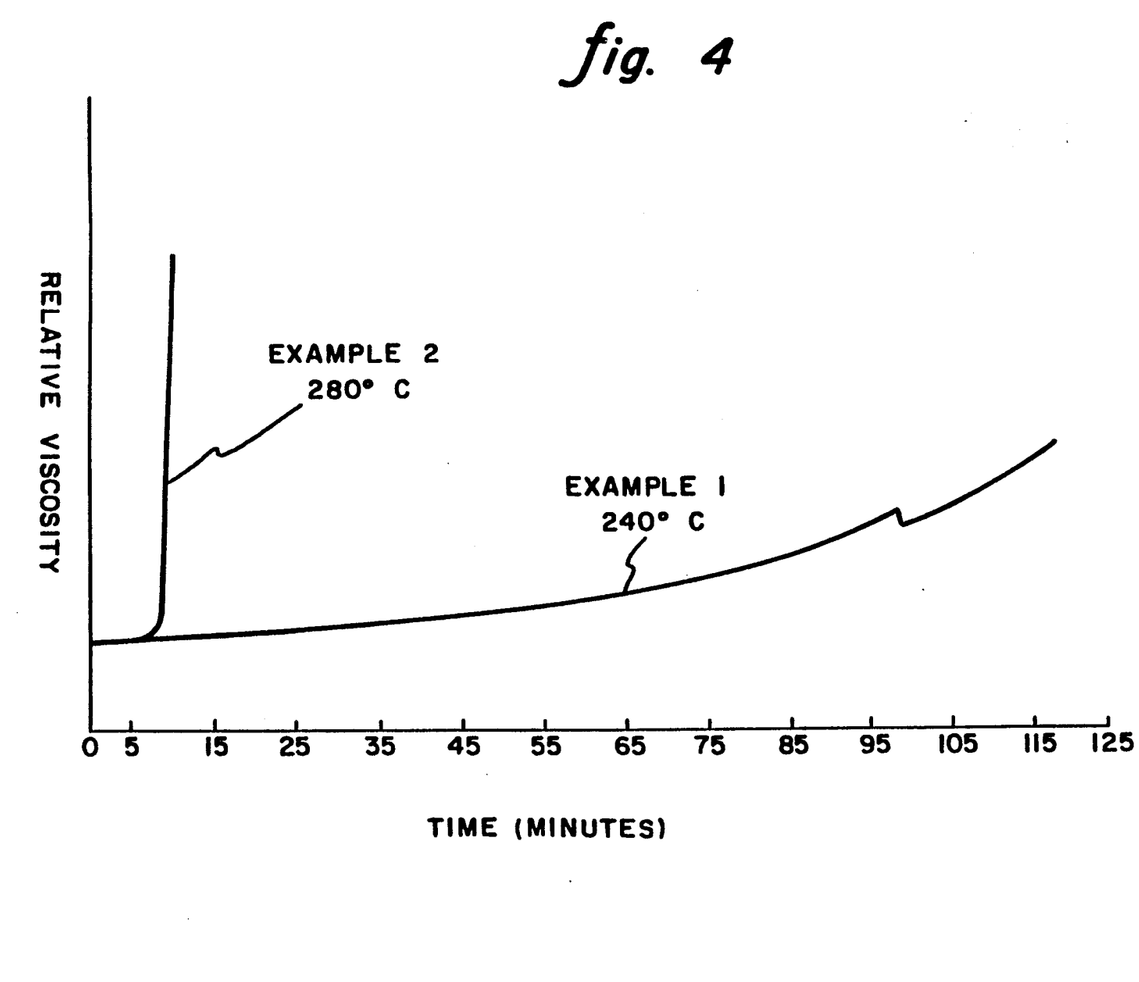
FIGS. 4–6 are graphical representations of viscosity changes with time of the compositions of this invention under various conditions.

The results are depicted graphically in FIG. 4. It is apparent that at 240° C., the polymerization reaction proceeds very gradually. At 280° C., on the other hand, it is rapid after an induction period of slightly more than 5 minutes.

EXAMPLES 3-5

A cyclic polycarbonate-catalyst composition similar to that of Examples 1-2 was prepared by dissolving the cyclics in methylene chloride, dispersing lithium salicylate in the amount of 0.025 mole percent in the solution and removing the solvent by vacuum stripping. Three 3.2-gram samples thereof were compressed into disks 5.1 cm. in diameter. Each disk was preheated at 130° C. for 10 minutes and transferred to the preheated test chamber of a Rheometrics System IV rheometer fitted with a cone-and-plate fixture. Viscosity measurements were made with the fixture in steady shear mode at a shear rate of 100 reciprocal seconds, with averages being taken of the counterclockwise and clockwise rotation runs. Comparison was made with controls not including the lithium salicylate.

Figure 5:
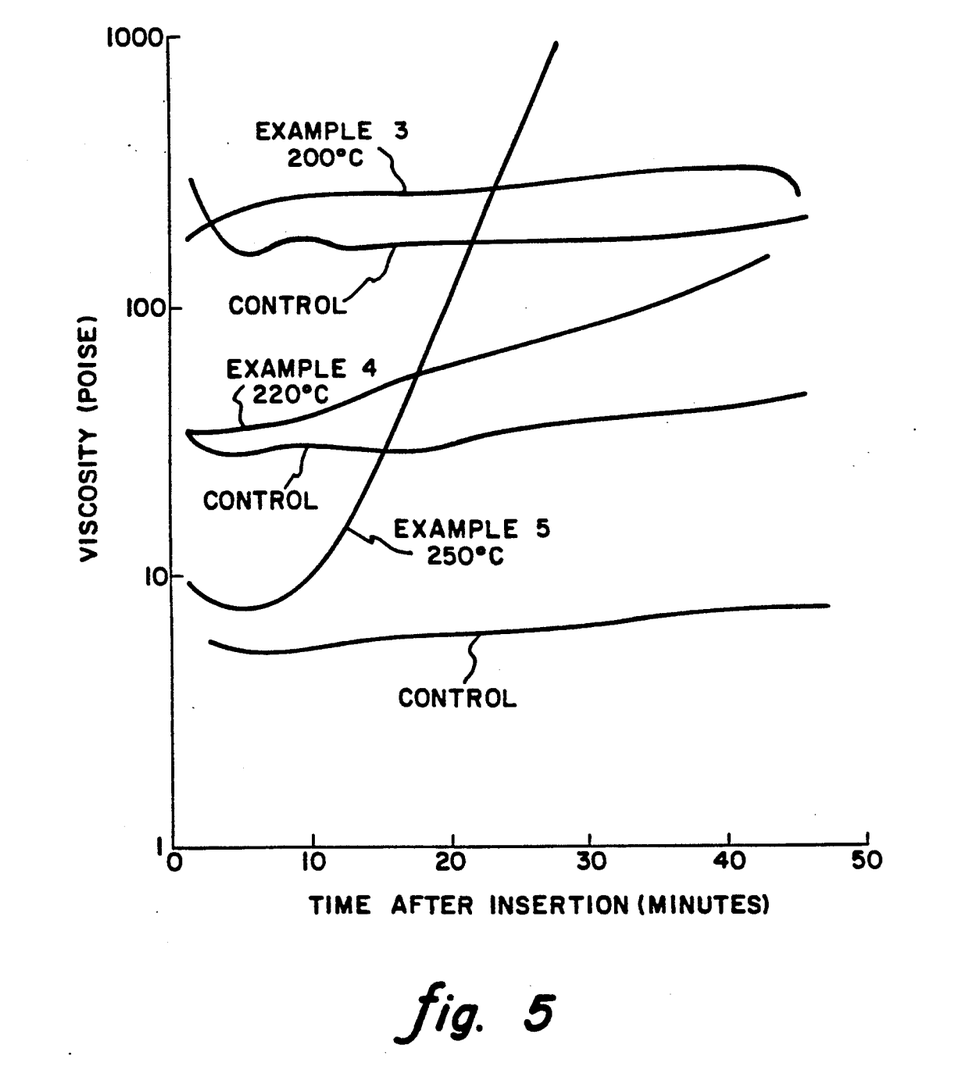

The results are depicted graphically in FIG. 5. It is apparent that the uncatalyzed and catalyzed compositions behave similarly at 200° C. At 220° C., polymerization of the composition of the invention is more rapid than that of the control but is still relatively slow; at 250° C., polymerization of the composition of the invention takes place rapidly after an induction period similar to that noted in Example 2.

EXAMPLES 6-8

Figure 6:
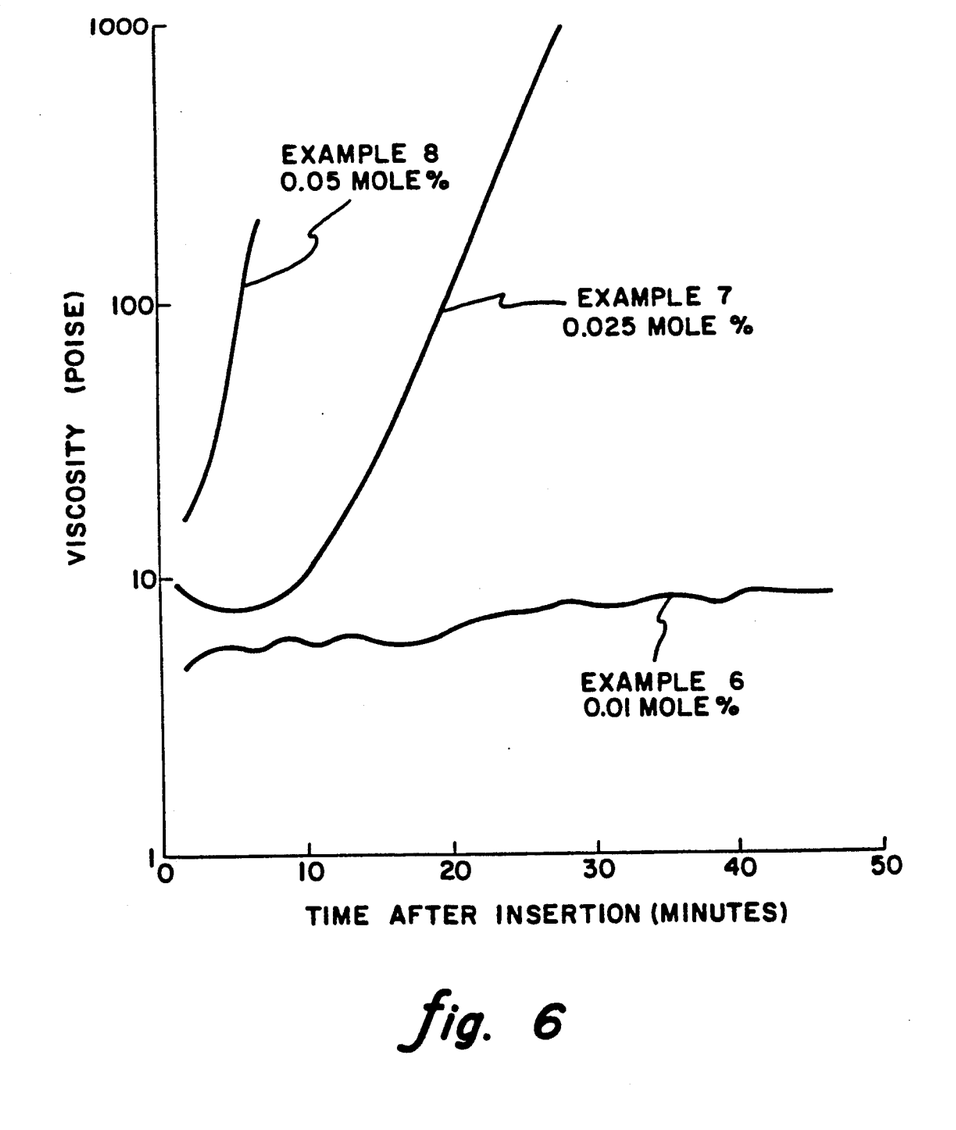

The procedure of Examples 3-5 was repeated, maintaining the temperature at 250° C. and changing the proportions of catalyst in the compositions. The results are depicted graphically in FIG. 6. It is apparent that polymerization occurs at all catalyst concentrations employed but is very slow at 0.01 mole percent; at this temperature, the use of higher catalyst proportions dramatically increases the rate of polymerization.

landed tool had a resin cavity whose dimensions were 15.2×20.3×0.3 cm. It was initially charged with a stack of 13 sheets of glass fiber cloth coated with an epoxy-compatible silane sizing. The mold was coated with a silicone mold release agent.

The vessel was charged with 160 grams of the composition of the invention and the press temperature was set at 250° C. The resin was stirred as its temperature was gradually increased to 250° C.; it melted at approximately 105° C., then fused into a very viscous, unstirrable mass and finally (at about 180° C.) reached a viscosity where stirring could be resumed.

When the temperature of the composition had stabilized at 250° C., the transfer tube was heated to the same temperature and lithium salicylate was added in the amount of 0.1 mole percent. The vessel was sealed and nitrogen was passed in via tube 6 at a pressure of 7 kg./cm.$^2$ to transfer the composition to the molding tool. After 15 minutes, the nitrogen pressure was released and the press temperature was increased to 300° C.; after the molding tool had reached that temperature, heating was continued for 30 minutes. The tool was then removed and placed between a pair of cold platens; when it had cooled to 38° C., it was opened and the composite part was removed. It was substantially void-free and contained glass fiber in the amount of 72% by weight. The weight average molecular weight of the polycarbonate matrix was up to 55,000; conversion to linear polycarbonate was about 95%.

EXAMPLE 10

Lithium salicylate-coated glass fiber was prepared by passing newly drawn fibers into contact with a belt on which an aqueous solution had been sprayed, said solution including the lithium salicylate and, in some instances, a conventional epoxy-compatible silane sizing agent. The fibers were collected into tows and wound on a spool.

The salicylate-coated glass was chopped and charged to a mold heated at 250° C., with even distribution of the fibers throughout the mold cavity. The composition of the invention was evenly sprinkled on top of the fibers and the mold was assembled, placed in the press and heated again to 250° C. under a pressure of 5.6 kg./cm.$^2$. Pressure was increased as necessary to a maximum of 17.6 kg./cm.$^2$, and heating in the press was continued for 5 minutes after which the mold was cooled and the resulting composite removed. The results of several runs performed according to this procedure are given in the following table.

| Run | Fiber diameter, microns | Li salicylate, mole % (calc.) | Sizing, % (calc.) | Total glass, % Calc. | Total glass, % Actual | Polymer % | Mw |
|---|---|---|---|---|---|---|---|
| 1 | 13 | 0 | 0 | 22 | 37 | >5 | — |
| 2 | 13 | 0.04 | 0 | 22 | 33 | 66 | 39,000 |
| 3 | 13 | 0.39 | 0 | 9 | 28 | 97 | 50,000 |
| 4 | 13 | 1.77 | 0 | 1 | 8 | 43 | 73,000 |
| 5 | 13 | 0.39 | 0.22 | 10 | 26 | 89 | 45,000 |
| 6 | 13 | 0 | 0.22 | 22 | 40 | >5 | — |
| 7 | 23 | 0.04 | 0 | 53 | 57 | 62 | 48,000 |
| 8 | 23 | 0.39 | 0 | 19 | 23 | 99 | 55,000 |
| 9 | 23 | 1.77 | 0 | 4 | 15 | 72 | 52,000 |
| 10 | 23 | 0.39 | 0.22 | 33 | 39 | 96 | 50,000 |
| 11 | 23 | 0 | 0.22 | 33 | 46 | 11 | 20,000 |

EXAMPLE 9

A resin transfer molding operation was performed in the apparatus represented in FIGS. 1-3. The aluminum

What is claimed is:

1. A method for preparing a resinous composition which comprises contacting, at a temperature in the range of about 250°–350° C., at least one cyclic polycarbonate oligomer with a catalytic amount of at least one monobasic metal salicylate.

2. A method according to claim 1 wherein a mixture of cyclic polycarbonate oligomers is contacted.

3. A method according to claim 2 wherein the cyclic polycarbonates comprise structural units of the formula wherein each of $A^1$ and $A^2$ is a monocyclic divalent aromatic radical and Y is a bridging radical in which one or two atoms separate $A^1$ from $A^2$.

4. A method according to claim 3 wherein the salicylate is present in the amount of about 0.001–0.5 mole percent, based on structural units in the oligomer composition.

5. A method according to claim 4 wherein the salicylate is an alkali metal salicylate.

6. A method according to claim 5 wherein the temperature is in the range of about 250°–300° C.

7. A method according to claim 6 wherein $A^1$ and $A^2$ are each p-phenylene and Y is isopropylidene.

8. A method according to claim 7 wherein the salicylate is lithium salicylate.

9. A method according to claim 2 wherein the salicylate is coated on highly polar fibers which are contacted with the cyclic polycarbonate oligomers.

10. A method according to claim 9 wherein the fibers are glass fibers.

11. A method according to claim 10 wherein the cyclic polycarbonates comprise structural units of the formula wherein each of $A^1$ and $A^2$ is a monocyclic divalent aromatic radical and Y is a bridging radical in which one or two atoms separate $A^1$ from $A^2$.

12. A method according to claim 11 wherein the salicylate is an alkali metal salicylate.

13. A method according to claim 12 wherein $A^1$ and $A^2$ are each p-phenylene and Y is isopropylidene.

14. A method according to claim 13 wherein the salicylate is lithium salicylate.

15. A polymerizable composition comprising cyclic polycarbonate oligomers comprising structural units of the formula wherein at least about 60% of the total number of R values are divalent aromatic organic radicals, the balance thereof being aliphatic, alicyclic or aromatic organic radicals; and at least one monobasic metal salicylate.

16. A composition according to claim 15 wherein each R radical has the formula wherein each of $A^1$ and $A^2$ is a monocyclic divalent aromatic radical and Y is a bridging radical in which one or two atoms separate $A^1$ from $A^2$.

17. A composition according to claim 16 wherein the salicylate is an alkali metal salicylate.

18. A composition according to claim 17 wherein the salicylate is present in the amount of about 0.001–0.5 mole percent, based on structural units in the oligomer composition.

19. A composition according to claim 18 wherein $A^1$ and $A^3$ are each p-phenylene and Y is isopropylidene.

20. A composition according to claim 19 wherein the salicylate is lithium salicylate.

* * * * *